United States Patent [19]

Provonchee et al.

[11] Patent Number: 5,277,915
[45] Date of Patent: Jan. 11, 1994

[54] GEL-IN-MATRIX CONTAINING A FRACTURED HYDROGEL

[75] Inventors: Richard B. Provonchee, Camden; Francis H. Kirkpatrick, Owls Head, both of Me.

[73] Assignee: FMC Corporation, Philadelphia, Pa.

[21] Appl. No.: 861,155

[22] Filed: Mar. 27, 1992

Related U.S. Application Data

[63] Continuation of Ser. No. 600,272, Sep. 26, 1990, abandoned, which is a continuation of Ser. No. 115,680, Oct. 30, 1987, abandoned.

[51] Int. Cl.$^5$ .................. A61K 9/14; C08J 5/20; C12N 1/16
[52] U.S. Cl. .................. 424/485; 424/422; 424/443; 424/464; 424/484; 424/488; 424/500; 424/501; 424/935; 424/529; 428/289; 428/306.6; 428/308.4; 428/320.2; 428/394; 428/402; 435/182; 521/28; 521/55
[58] Field of Search .................. 521/28, 55; 424/443, 424/439, 441, 444, 409, 485; 428/308.4, 289, 402, 403, 404, 407.3; 523/122

[56] References Cited

U.S. PATENT DOCUMENTS

| | | |
|---|---|---|
| 2,887,127 | 4/1959 | Hetzel . |
| 3,689,634 | 9/1972 | Kliment .................. 424/475 |
| 3,973,355 | 8/1976 | McKenzie .................. 47/37 |
| 4,127,547 | 11/1978 | Smarook .................. 524/390 |
| 4,241,537 | 12/1980 | Wood . |
| 4,320,759 | 3/1982 | Theeuwes .................. 424/473 |
| 4,452,892 | 6/1984 | Rosevear .................. 435/176 |
| 4,530,905 | 7/1985 | Freedman . |
| 4,569,861 | 2/1986 | Smith et al. .................. 427/244 |
| 4,578,406 | 3/1986 | Volz .................. 521/55 |
| 4,640,778 | 2/1987 | Blomback et al. .................. 210/484 |
| 4,649,075 | 3/1987 | Jost .................. 424/449 |
| 4,692,336 | 9/1987 | Eckenhoff et al. .................. 424/468 |

FOREIGN PATENT DOCUMENTS

| | | |
|---|---|---|
| 41934 | 12/1981 | European Pat. Off. . |
| 56-155642 | 6/1980 | Japan . |
| 59-064848 | 4/1984 | Japan . |
| 2300362 | 12/1990 | Japan . |

OTHER PUBLICATIONS

Chem. Abstracts vol. 100 Entry 103776u Masimou et al.
Schafer-Nielsen, *Electrophoresis* 1987, 8, pp. 20-24, "Design of a Vertical Gel Slab Electrophoresis Apparatus Containing a Permanent Salt Bridge".

*Primary Examiner*—Peter F. Kulkosky
*Attorney, Agent, or Firm*—Mark A. Greenfield; Richard E. Elden; Robert L. Andersen

[57] ABSTRACT

A three dimensional porous matrix, such as a reticulated open-cell foam, having within its matrix structure a mechanically-fractured hydrogel containing a network of fracture channels. The mechanically-fractured hydrogel may be a gel that has been partially dewatered by compression of the gel in situ.

The porosity of the gel-in-matrix makes it useful for chromatographic applications and for immobilization of biologically-active components, where efficient, intimate contact of the hydrogel with a liquid medium is important.

50 Claims, No Drawings

GEL-IN-MATRIX CONTAINING A FRACTURED HYDROGEL

This application is a continuation of application Ser. No. 600,272, filed Sep. 26, 1990, now abandoned which, is a continuation of application Ser. No. 115,680, filed Oct. 30, 1987, now abandoned.

BACKGROUND OF THE INVENTION

The invention relates to a three dimensional matrix, such as porous foam, which has within its porous structure a mechanically-fractured hydrogel that contains a network of fracture channels. More particularly, the gel-in-matrix may contain a mechanically-fractured hydrogel that has been partially dewatered to create the porous network of fracture channels.

Gel-forming materials such as hydrogels are well known for their usefulness in electrophoretic and chromatographic procedures, as well as for the immobilization of biologically active materials. The microporosity of hydrogels allows their use in the electrophoretic separation of macromolecular fragments according to size via their diffusion at different rates through the gel. The permeability of these hydrogels, however, is limited by the small size of the pores in the gel and by the diffusion-controlled flow in such pores. Gel porosity may be enhanced to a limited degree by using low concentrations of the gel forming material, but the resultant gels are ordinarily fragile and difficult to handle.

U.S. Pat. No. 4,452,892 issued to Rosevear concerns the immobilization of biologically active components in a gel-forming material which is retained on or in a support medium like woven cloth or thin section sponge. The support material serves to inhibit sedimentation of the biologically active components prior to and during gelling and to reinforce the gel composite that is formed.

It is evident that the permeability of the gel employed in such gel composites is a controlling factor in the reactivity or activity of the gel composite, when the latter is exposed to a fluid containing species that can interact with the biologically active components immobilized within the gel.

British Patent No. 1,570,485 issued to Winson and European Patent No. 41,934 issued to Laszlo do not concern immobilization of biologically active materials but instead describe foam structures containing polymer particles that are gel-forming and that are capable of imbibing large amounts of water. The foam structure provides a support medium for the gel-forming particles, which only occupy a small fraction of the foam's void volume and which are typically introduced into the foam structure via dry blending with foam pieces or via organic solvent carriers.

These gel composites suffer from drawbacks that limit their utility. The polymer particles may become dislodged from the foam structure unless anchored with a binder material. The difficulty of ensuring uniform distribution of the polymer particles throughout the open cell foam structure places constraints on the maximum usable size of polymer particles and on minimum usable pore size in the foam structure.

The present invention concerns a gel-containing matrix structure that not only possesses the advantages realized by the prior art gel composites but also avoids many of their drawbacks.

SUMMARY OF THE INVENTION

The article of manufacture of the present invention is characterized by a three dimensional porous matrix having within its matrix structure a mechanically-fractured hydrogel containing a network of fracture channels. The mechanically-fractured hydrogel is preferably a partially-dewatered hydrogel, which has been dewatered in situ via mechanical means to yield the network of fracture channels.

The three dimensional porous matrix may be either rigid or flexible. The matrix is preferably a reticulated open-cell flexible foam.

The hydrogel is preferably a polysaccharide hydrogel and is more preferably selected from the group of alginate, carrageenan, agar and agarose gels.

The hydrogel fracture channels create a relatively porous structure for the gel-in-matrix of this invention, allowing relatively free ingress and egress of liquid media that may be contacted with the gel-in-matrix. The porosity, or void volume, of the gel-in-matrix may range from about 10 to 90%, but is preferably 50 to 90%. The fracture channels in the gel desirably have a mean characteristic dimension i.e., corresponding to a pore diameter, of from 0.1 $\mu$m to 1000 $\mu$m, preferably in the range of 1-100 $\mu$m.

The gel-in-matrix of this invention is preferably a mechanically-fractured hydrogel whose fracture channels have been created during partial dewatering of the gel in situ, by compression and decompression of the hydrogel while in the matrix. The dewatered hydrogel in the gel-in-matrix typically contains from 10 to 90% of the original gel weight prior to dewatering.

The hydrogel in the gel-in-matrix may alternatively be a mechanically-fractured gel that has been obtained via freezing and thawing of the gel in situ, within the matrix, which ordinarily results in the gel being partially dewatered. Other mechanical means for creating fracture channels within the hydrogel may also be used, as described further below, with or without concomitant partial dewatering.

The gel-in-matrix of this invention may be used in chromatographic applications. Another field of utility is immobilization or entrapment of biologically active materials within the gel used to prepare the gel-in-matrix, since the porosity created by the fracture channels facilitates efficient, intimate contact of a liquid medium with the biologically active components within the gel-in-matrix.

DETAILED DESCRIPTION

The gels-in-matrix of this invention exhibit unusually good apparent gel strength because of the support and protection against gel disruption or collapse provided by the matrix structure. Fragile gels that cannot easily be handled in conventional slab or bead form can be employed as the hydrogel in a gel-in-matrix. Such gels-in-matrix can be manipulated or used in applications that would ordinarily be precluded from consideration due to the inherent weakness of the hydrogel.

The gels-in-matrix of this invention are also characterized by having both high porosity and large pores, or fracture channels. The network of fracture channels in the hydrogel of the gel-in-matrix creates good hydraulic permeability, i.e., its porosity and pore sizing are such as to allow aqueous media to flow freely through the gel-in-matrix. Porosity of the gel-in-matrix may range from about 10 to 90%, but is preferably about 50 to 90%.

It should be understood that the hydrogel of the gel-in-matrix will also contain the micropores normally found in such hydrogels. References to gel fracture channels in this disclosure do not refer to such micropores, since the size of the fracture channels is substantially larger than that of the hydrogel's micropores.

The fracture channels of the gel-in-matrix have a mean characteristic dimension of from about 0.1 $\mu$m to about 1000 $\mu$m. This characteristic dimension, an indicator of the channels width or diameter, is preferably in the range of from about 1-100 $\mu$m. The fracture channel network of the gel-in-matrix significantly increases the available surface area of the hydrogel, as compared to conventional slab hydrogels. The support provided by the matrix structure also ensures the continued viability of the fracture channel network throughout the hydrogel, during use of the gel-in-matrix.

The fracture channels in the gel-in-matrix of this invention are created by mechanical means. This is ordinarily accomplished by first forming a hydrogel within the matrix structure and thereafter treating the hydrogel in situ, by the preferred mechanical method, to fracture the gel. Formation of a hydrogel within the matrix is typically accomplished, in a conventional manner, by saturating the matrix with an aqueous solution containing the gel-forming component and thereafter inducing formation of a hydrogel, by cooling or otherwise. This results in a hydrogel that completely fills the void spaces, cavities, and/or interstices within the three dimensional matrix structure.

Mechanical treatment of this intact hydrogel within the matrix structure is the means employed for creating the network of fracture channels within the hydrogel of the gel-in-matrix. It should be evident that the matrix structure's porosity characteristics place an upper limit on the size of the fracture channels that can be created within the hydrogel. For example, the fracture channels in a gel-in-matrix employing reticulated open-cell foam as the matrix structure cannot exceed the size of the cells in the foam.

The preferred mechanical treatment method for creating the fracture channel network in the gel-in-matrix is partial dewatering of the hydrogel in situ.

The partially-dewatered gel-in-matrix of this invention is based on the unexpected discovery that when an intact hydrogel formed within a three dimensional porous matrix structure is compressed or squeezed, only water is expressed. One would have expected that pieces of the hydrogel itself would be expressed by such squeezing treatment since an intact hydrogel, absent a matrix structure supporting the gel, ordinarily breaks into pieces and fragments of gel when subjected to squeezing. It should be understood that the inventors do not wish to be bound by this theory since the physical basis of this invention is still not fully understood.

The partial dewatering treatment is preferably carried out as the mechanical means for forming fracture channels but may also be accomplished in conjunction with other mechanical treatments that create the fracture channels, some of which are described below. Likewise, these alternative mechanical treatment methods may also be the sole means used to form the fracture channel network.

The mechanical dewatering treatment is desirably sufficient to create a dewatered, fractured hydrogel that contains from about 10 to 90% of its original gel weight, i.e., prior to dewatering. Preferably, the fractured, dewatered hydrogel contains from 15 to 50% of its original weight, as compared with the hydrogel weight prior to dewatering.

The partial dewatering may readily be accomplished by compression of an intact hydrogel contained within a flexible, resilient matrix, followed by decompression, which yields a network of fracture channels within the hydrogel. Centrifugal force is also an effective mechanical means for partially dewatering a matrix structure containing a gel. This technique is especially useful with rigid matrix structures which cannot be readily treated by the compression/decompression procedure.

It must be stressed that this partial dewatering treatment to form fracture channels in the hydrogel must be accomplished via mechanical means, such as compression/decompression or one of the other mechanical procedures described above. When a hydrogel contained within a matrix is dehydrated by conventional drying, at ambient or elevated temperatures, the resultant partially-dehydrated gel will not exhibit the favorable characteristics of the gel-in-matrix of this invention, e.g., rapid rehydration when exposed to water.

The partially dewatered, fractured gel-in-matrix of this invention may be exposed to an aqueous medium and will exhibit partial rehydration of the gel, within a relatively short period of time. Such rehydration, however, is not total so it does not cause a complete loss of porosity for the gel-in-matrix; the fracture channels are not closed or healed via such hydration.

This ability of a fractured, partially-dewatered gel-in-matrix to rehydrate itself when exposed to an aqueous medium, without losing its desirable porosity characteristics, is one aspect that creates numerous end-use applications for gel-in-matrix, e.g., in chromatographic separations. Rehydration of the partially-dewatered, fractured gel typically results in a rehydrated gel containing at least 80 to 90% (but less than 100%) of the original gel weight prior to dewatering.

The partial dewatering treatment is preferably carried out as the mechanical means for forming fracture channels but may also be accomplished in conjunction with other mechanical treatments that create the fracture channels, some of which are described below. Likewise, these alternative mechanical treatment methods may also be the sole means used to form the fracture channel network.

These other mechanical means used to form the fracture channels in the gel-in-matrix may include freezing and thawing of the hydrogel in situ, in one or more freeze-thaw cycles. Another technique, useful with resilient matrix structures such as flexible foamed plastics, involves stretching of the matrix structure containing an intact hydrogel. Yet another procedure that gives satisfactory results is exposure of the hydrogel in situ to a gas under pressure, to induce diffusion of the gas into the gel within the matrix structure, and thereafter rapidly releasing the gas pressure to cause fracturing of the gel. The initial gas diffusion may take place either before or after gelling of the hydrogel within the matrix structure.

The hydrogel employed in the gel-in-matrix of this invention may be selected from a wide variety of known hydrogel materials.

The hydrogel is desirably thermally-reversible. The hydrogel may alternatively be a gel that is not readily reversed from its gel state. Gels obtained by cross-linking of water soluble polymers, e.g., cross-linked polyacrylamide gels, are examples of the latter.

The hydrogel may be obtained from a mixture of gel-forming components. Other water-soluble components or additives may also be present in the hydrogel, in addition to the gel-forming component. Such components include buffers and other additives conventionally used with hydrogels.

The hydrogel may also contain organic components, soluble in or miscible with the water or aqueous medium in the aqueous gel. The aqueous medium used to form the hydrogel may contain organic solvents like lower alkyl alcohols, such as methanol or ethanol, or polyols, such as propylene glycol or glycerol, or lower alkyl ketones and lower alkyl aldehydes, in amounts that are miscible with the aqueous medium and which do not unduly interfere with formation of the gel.

The gel-forming component may be present in the hydrogel in a wide range of concentrations, the precise amount depending on the application intended for the gel-in-matrix, on the physical characteristics of the gel sought, on the gelling properties of the gel-forming component used, and other similar factors. The gel-forming component may be present in very low concentrations, in amounts as low as 0.05 wt % or less, based on the original hydrogel weight prior to fracturing and dewatering, if any. The gel-forming component is preferably present in amounts of from o.1 to 10 wt %, more preferably 0.5 to 4 wt %, based on the original hydrogel weight prior to fracturing and dewatering, if any.

Among the many suitable gel-forming materials useful for the gel-in-matrix, polysaccharide gels are particularly preferred. Polysaccharide hydrogels that are preferred include alginate, carrageenan, agar, and agarose; other polysaccharides, e.g., curdlan, pullulan, gellan and the like are also useful as the hydrogel-forming component.

Agarose gels are especially preferred, the low gelling/melting temperature agarose gels being especially useful in gel-in-matrix applications involving biologically active materials. Agarose may be employed with good results in amounts of less than about 1 wt % agarose; in some matrix structures amounts of less than 0.1 wt % agarose still yield a useful gel-in-matrix, all weights based on the original hydrogel weight prior to fracturing and dewatering, if any.

The gel-forming component, agarose being especially preferred, may be treated with a derivatizing agent to provide derivatization groups useful in affinity chromatography, ion exchange chromatography, hydrophobic interaction chromatography or gel permeation chromatography. The gel-forming component is desirably treated with the derivatizing agent prior to casting of the hydrogel in the matrix structure. In some circumstances, it is conceivable that the derivatization of the gel-forming component could take place by treating the hydrogel after its formation in the gel-in-matrix.

The hydrogel in the gel-in-matrix may contain not only dissolved components or additives, as mentioned above, but also, or alternatively, undissolved components immobilized, entrapped or encapsulated within the gel. Such undissolved components immobilized within the hydrogel may be solid components or even an immiscible liquid, in the form of dispersed droplets or the like.

Biologically active components may also be immobilized with the gel of the gel-in-matrix. Such components may include multicellular structures, cells, viruses, proteins, enzymes, nucleic acids such as DNA, and the like. This embodiment of gel-in-matrix is one that appears to have utility in many fields, e.g., cell culture, bioreactors, and the like.

The matrix of the gel-in-matrix is a three dimensional porous structure that provides support for the fractured hydrogel. The matrix structure serves as a skeleton which maintains the integrity of the fractured hydrogel as an entity whose external dimensions are commensurate with those of the matrix structure, i.e., coextensive with the matrix structure's size and shape. The nature of the matrix structure employed for a gelin-matrix clearly affects the porosity and other characteristics of the network of fracture channels gel-in-matrix. Selection of the porous, three dimensional matrix structure must therefore take into consideration the desired functions of the gel-in-matrix.

The matrix may be an ordered, regular structure, e.g., a lattice work, or it may be random in its structure, e.g., a mass of nonwoven fibers. It should be apparent that a wide variety of matrix structures will provide the necessary functions, i.e., support, protection and porosity, that are essential for use in gel-in-matrix of this invention. In order to provide the necessary support function, the matrix should have pores or openings whose mean characteristic dimension, e.g., diameter, is less than about 2 mm. Combinations of matrix structures, i.e., laminates or the like, may also be used.

The material used for the matrix should be substantially inert with respect to the hydrogel of the gel-in-matrix. The matrix material is likewise desirably inert and non-reactive with any additives or non-gel components present within the hydrogel.

The matrix material is ordinarily selected from materials that are water-insoluble since the hydrogels are desirably formed within the matrix structure from aqueous gel-forming solutions. The matrix structure may, however, be made from a water-swellable material.

Aside from these constraints, there are no other significant limitations on the matrix material.

The matrix material is preferably hydrophilic, since this characteristic facilitates introduction of the aqueous gel-forming solution into the porous matrix structure. This may be an inherent characteristic of the matrix material or may be achieved via treatment of the matrix structure, its material or surface.

The matrix structure and its characteristics are also influential on the shape of the gel-in-matrix, which may take the form of a thick or thin sheet, single or multiple strands, a plug or disc, a cylindrical annulus, beads, or the like.

The gel-in-matrix may be prepared from a matrix structure having the desired shape for the final gel-in-matrix, by casting and fracturing the gel in a preformed matrix structure having the specific shape desired. It should be evident that the shape and thickness of the gel-in-matrix and matrix resiliency are important considerations in determining the mechanical means to be used to effect fracturing of the gel. The desired shape for the gel-in-matrix may alternatively be obtained, by cutting, or shaping a particular form from a large block or mass of gel-in-matrix.

The matrix structure may be either rigid or flexible. Flexible structures facilitate formation of the fracture channels via mechanical compression. Rigid structures provide especially good support for the fractured gel in the gel-in-matrix.

Porous foams are especially preferred for use as the matrix structure. Foamed porous plastics are preferred, especially polyurethane foam. Other plastic foams like polyolefin foam and polyvinyl chloride foam are also satisfactory. Porous cellulosic foams may also be used as the matrix structure.

The foams may be rigid or flexible, as desired. The foams must be porous and should therefore be open-cell foams, either having been cast as such or treated following casting. Reticulated, open-cell foams are especially preferred, especially polyurethane foams, and these are preferably flexible, resilient foams.

Foams having from about 20 to 200 pores per inch, corresponding to a pore size diameter of about 1 to 0.02 mm, have characteristics that are ordinarily desired for the gel-in-matrix of this invention. Foams with pores of about 30 to 150 pores per inch (ppi) are very preferred. A 30 ppi foam is usually considered to be a coarse foam, whereas a 100 ppi foam is ordinarily considered a fine foam.

Coarse foams that are also flexible typically exhibit good resilience and will recover their original size and shape after being compressed with an intact hydrogel in situ. This desirable behavior contrasts with fine foams, which are less apt to recover their original size and shape following compression and decompression with an intact hydrogel in situ.

Porous non-foamed plastics, porous ceramics or porous metals, which have interconnected internal porosity, can also serve as the matrix structure. The matrix structure may alternatively be a mass of nonwoven fibers made of a plastic, cellulosic or other suitable material.

Other three dimensional matrix structures, such as woven fabrics in single or multiple layers, or braided or twisted fibers, may also be employed. Laminate structures, such as a nonwoven or woven matrix sandwiched between layers of open-cell foam, may also be useful in certain contexts.

The gel-in-matrix articles of manufacture of this invention have many uses and applications, extending across a broad spectrum of wholly unrelated fields.

The gel-in-matrix has wide ranging utility because of its extraordinary porosity and high structural strength (i.e., its apparent gel strength), properties that are ordinarily mutually exclusive.

The following examples not only illustrate the gel-in-matrix of this invention in a variety of embodiments, but suggest some of the fields in which this invention may be employed.

EXAMPLE 1

Two blocks of reticulated, coarse open-cell (30 pores per inch) flexible polyurethane foam blocks (1×½×½ in. in size) are saturated with a hot aqueous solution containing 1 wt % SeaKem ® ME agarose (FMC Bio-Products, Rockland, Maine) and 1 wt % Kaopolite ™ china clay to fill all of the available cells in the foam, and the aqueous gel solution is then allowed to gel in the foam blocks by cooling. The china clay additive is employed to facilitate visual observation of the agarose gel in the following procedures.

One of the gel-containing foam blocks is then carefully cut in half. The block is not squeezed or subjected to rough handling. When the cut surface is viewed under a microscope at 40 power, the surface appears to be a continuous surface of agarose gel. Visible portions of the foam matrix at the surface appear to be surrounded by agarose gel. The agarose gel surface shows no signs of voids or passageways within the gel.

A second block of the gel-containing foam is manually squeezed between two plates of acrylic plastic, and about 75 to 80% of the water in the original gel is expressed during this procedure. There is no visible evidence of agarose gel fragments or pieces in the expressed liquid. When the compression pressure is released and the plates of acrylic plastic removed, the partially-dewatered gel-in-matrix reexpands and regains substantially all of its original volume and shape.

The block is next cut in half in a direction perpendicular to the squeeze faces of the block. When the cut surface of the decompressed foam block is viewed under a microscope at 40 power, the surface shows small denseappearing particles of agarose gel contained within the visible portions of the gel matrix. Voids and passageways are visibly evident between the agarose particles in the viewed gel-in-matrix surface, evidencing the existence of a network of fracture channels within the partially-dewatered gel-in-matrix.

To illustrate rehydration with water, the cut surface of the partially-dewatered gel-in-foam block is flooded with distilled water for about 1 minute and thereafter examined. During this time, the gel-containing foam block retains its approximate original size. When viewed under a microscope at 40 power, the agarose particles visible on the cut surface appear to have swelled into spherical, bead-like particles that are relatively uniform in size. The visual microscopic examination also confirms the existence of channels between the bead-like particles of agarose.

EXAMPLE 2

In lieu of the polyurethane foam of the previous example, this Example used a piece of nonwoven fiber plastic scouring pad as the three dimensional matrix material. The piece of non-woven plastic pad was a block 1"×2"×¼ in size. A hot solution containing 1 wt % SeaKem ® ME agarose was contacted with the non-woven pad so as to fill all of the available void space within the matrix. The agarose gel solution was allowed to cool to form a gel within the matrix, after which the gel in the matrix was trimmed to remove agarose on the outside surface of the matrix.

The gel-in-matrix was then placed between two plates of acrylic plastic and slowly squeezed in a small bench vise. The liquid which was expressed during compression was clear and showed no visual evidence of agarose contamination. Weight measurements of the matrix material and of the gel-in-matrix before and after squeezing indicated that the dewatered gel-in-matrix contained only 25% of the water present in the original gel, prior to squeezing. The partially-dewatered gel-in-matrix regained virtually all of its original volume and shape after the squeezing pressure was released. This evidenced a void volume of about 75% in the partially-dewatered gel-in-matrix, attributable to the network of fracture channels created by this mechanical treatment.

EXAMPLE 3

This Example 3 illustrates a partially-dewatered gel-in-matrix that has been dewatered via centrifugation of a gel-containing foam matrix. The Example also demonstrates a partially-dewatered gel-in-matrix in which biologically active components remain entrapped within the gel during the dewatering procedure.

Whole human blood (containing ethylenediaminetetraacetic acid (EDTA) to prevent the blood from clotting) was mixed in equal amounts with a hot solution containing 1 wt % SeaKem ® ME agarose and 0.7 wt % aqueous sodium chloride (to prevent lysing of the whole blood cells in aqueous solution), at approximately 55° C. The matrix used in this example was rigid, porous (medium pore, approximately 70 μm) polyethylene plastic. A small, plug-shaped piece of the porous polyethylene plastic was saturated with the blood-containing hot agarose solution and the rigid plastic matrix containing the gel solution was cooled to cause gel formation.

The gel-containing porous plastic matrix was placed in a test tube that had been fitted with a spacer to keep the gel-in-matrix at a distance from the bottom of the tube. The test tube was placed in a laboratory centrifuge and spun at about 2000 rpm for approximately minutes. This centrifuge treatment caused about 30–40% of the liquid originally contained in the gel within the plug matrix to be expressed into the reservoir the bottom of the test tube.

The expressed liquid was pale yellow in appearance and evidenced only slight amounts of red blood cell contamination. Despite expression of a substantial proportion of the gel liquid, the red blood cells remained immobilized within the partially-dewatered gel-in-matrix structure in substantially intact form. Since the rigid plug retained its original volume and shape following centrifugation, this evidenced a void volume in the porous plug of approximately ⅓.

EXAMPLE 4

The procedure described in this Example 4 suggests that entrapment or immobilization of fragile cells within the hydrogel contained in a foam matrix allows the cells to withstand partial dewatering of the gel via compression or squeezing without appreciable fracturing of the cells.

Plug-shaped pieces of reticulated open-cell (100 ppi) flexible polyurethane foam were used as the matrix in this Example. A hot solution containing 10% whole human blood containing EDTA and 0.7 wt % NaCl and also containing 1 wt % SeaPlaque ® agarose was used to saturate the foam pieces. The gel pieces were then refrigerated at a temperature of 4° C. for a few hours to cool the solution within the gel pieces and thereby form a gel.

One of these gel-containing foam plugs, a cylindrical plug approximately 2"×½" in diameter, was manually stretched along its longitudinal axis to fracture the gel within the foam matrix. During the stretching treatment, liquid was expressed from the gel within the foam matrix. After the stretching treatment, the partially-dewatered gel-containing plug regained its original size and shape.

The stretched gel-containing plug was then inserted into the barrel of a 5 ml syringe. An aqueous wash solution containing 0.7 wt % NaCl was then run through the syringe to wash the gel-containing plug, in order to flush out loose red blood cells and gel particles from the column. The wash solution flowed through the column with little resistance and after a few minutes the washed solution exiting from the syringe was clear and virtually free of any visible solid contaminants.

Following the washing step, the partially-dewatered gel-in-matrix was subjected to a procedure that illustrates the existence of a network of fracture channels within the partially-dewatered gel-in-matrix. After the washing treatment with saline solution, distilled water was then flowed through the syringe. Almost immediately after this treatment was begun, the exiting fluid appeared bright red, indicating that the whole red blood cells had been lysed by the distilled water. The rapidity with which the cells can be lysed in the partially dewatered gel-in-foam (when contacted with distilled water) indicates that the entrapped cells are readily accessible to contact with an aqueous or other liquid medium via the fracture channel network in the partially-dewatered gel-in-matrix.

EXAMPLE 5

This Example illustrates freeze/thaw as the means for creating a mechanically-fractured hydrogel within a porous matrix.

Small blocks of reticulated open cell (100 ppi) ible polyurethane foam, about 1"×½"×½ in size, were used as the three dimensional matrix. A hot solution containing 2 wt % SeaKem ® ME agarose was used to saturate the foam blocks, which were thereafter cooled to effect formation of a gel. The gel-containing foam blocks were placed in a freezer at a temperature of −20° C. overnight and then removed and allowed to thaw at room temperature.

This freeze/thaw cycle caused the gel-containing foam blocks to exhibit good porosity since water could be flowed through the treated gel-containing foam blocks with ease. Water poured on top of the block flowed freely through the block and out the bottom, demonstrating the network of fracture channels that existed throughout the gel-in-matrix.

EXAMPLE 6

This Example illustrates the use of a partially dewatered gel-in-foam matrix to immobilize yeast cells which are then employed to make ethanol from a dextrose feed solution contacted with the immobilized cells within the gel-in-matrix.

Dry baker's yeast (14 grams) was dissolved in an aqueous agarose solution containing 1 wt % SeaKem ® LE agarose (120 ml) at 45° C. A cylindrical plug (2"×9/16") of reticulated open-cell (100 ppi) flexible polyurethane foam was saturated with the agarose solution and thereafter placed in a refrigerator to cause gelation of the solution by cooling.

The gel-containing foam plug was removed from the refrigerator and manually squeezed between two plates of acrylic plastic to fracture the gel within the foam and express water. After fracturing, the partially-dewatered gel-in-foam was contacted with distilled water; the gel-containing plug was then squeezed and recontacted with distilled water two more times.

The rehydrated, gel-in-foam plug was then inserted into the barrel of a 10 μml syringe, fitted with inlet and outlet tubes to allow passage of a liquid medium through the gel-containing plug in the syringe barrel. Distilled water was flowed through the gel-containing plug in the syringe until the outlet fluid was observed to be clear and free of any visible yeast cells. This required approximately 150 ml distilled water.

A sterile solution of dextrose (10 wt %) was flowed through the gel-containing plug in the syringe barrel at a rate of approximately 2.2 ml per minute. The evolution of gas was evident almost immediately. Dextrose solution contained in a 300 ml reservoir was recirculated through the gel-containing plug in the syringe barrel for about 3¾ hours. Samples of the outlet fluid were periodically collected and the ethanol concentration in these samples was measured.

| Time (Minutes) | Ethanol Concentration (g/l) |
|---|---|
| 10 | 1 |
| 120 | 1.8 |
| 225 | 3.4 |

The sample taken after 10 minutes approximates the results expected from a single pass of the dextrose solution through the gel-in-foam in the syringe barrel.

EXAMPLE 7

This Example illustrates the use of a partially-dewatered gel-in-matrix that has utility as an ion exchange medium.

A hot aqueous solution containing 0.25 wt % carboxymethyl agarose and 0.75 wt % SeaKem ® ME agarose was used to saturate a small block of reticulated open-cell (100 ppi) flexible polyurethane foam. The gel solution in the foam was allowed to gel by cooling and then manually squeezed between two plates of acrylic plastic to fracture the gel contained within the foam matrix and express water. The partially-dewatered gel-containing foam matrix was then contacted with water to rehydrate the gel-containing foam.

A protein solution containing 1% cytochrome c at ambient temperature was then dripped through the gel-in-foam until the gel-containing foam matrix had been saturated with this red-colored protein solution. Water was then dripped through to wash the gel-in-foam and remove protein not ionically bound to the agarose. This continued until the liquid flowing out of the gel-containing foam was observed to be clear.

An aqueous salt solution (1M NaCl) was thereafter run through the gel-containing foam to unbind the protein. Shortly after this was begun, the effluent liquid was observed to be very red in color, indicating that the ionically-bound protein was readily eluted with the salt solution flowing through the fracture channel network in the partially-dewatered gel-in-matrix ion exchange medium.

EXAMPLE 8

This example illustrates a partially dewatered gel in a foam matrix used in gel permeation chromatography.

A hot solution containing 4 wt % SeaKem ® LE agarose was used to saturate a cylindrical foam plug of reticulated open-cell (100 ppi) flexible polyurethane foam, 150 mm long by 12 mm diameter. The agarose solution was allowed to gel in the foam matrix by cooling and thereafter the foam plug was manually squeezed between two plates of acrylic plastic to fracture the gel contained within the foam matrix and express water. The partially dewatered gel-in-foam matrix was rehydrated with distilled water. The squeezing/compression/rehydration procedure with water was repeated two more times. The gel-containing cylindrical foam plug was then encased in a column by fitting the plug with inlet and outlet nipples and potting the plug and nipples in waterproof epoxy.

A gel permeation chromatography procedure was run under the following conditions:

| | |
|---|---|
| Sample | 0.1 ml of 0.1% blue dextran and 0.1% adenosine triphosphate |
| Eluant | 0.2 wt % NaCl |
| Eluant Flow Rate | 16 ml/hour |
| Column Head | 160 cm |

Flow and flow rate observatation during this procedure indicated the column contained a void volume of about 6%. The gel permeation chromatography experiment resulted in a clear separation of the blue dextran from the adenosine triphosphate.

We claim:

1. A gel-in-matrix combination comprising a three-dimensional porous support matrix and a porous fractured hydrogel fixedly disposed therein, in which said fractured hydrogel has: (a) a void volume of about 10–90%; and (b) a plurality of porous fractures comprising channels having a mean characteristic dimension of about 0.1–1,000 μm.

2. The gel-in-matrix of claim 1 wherein said fractured hydrogel void volume is about 50–90%.

3. The gel-in-matrix of claim 1 wherein said hydrogel fracture channels have a mean characteristic dimension of about 1–100 μm.

4. The gel-in-matrix of claim 2 wherein said hydrogel fracture channels have a mean characteristic dimension of about 1–100 μm.

5. The gel-in-matrix of claim 1 wherein said hydrogel is thermally reversible to a liquid.

6. The gel-in-matrix of claim 1 wherein said hydrogel is a polysaccharide which is thermally reversable to a liquid.

7. The gel-in-matrix of claim 1 wherein said hydrogel is an alginate, carrageenan, agar, agarose, curdlan, pullulan, gellan, a derivatized composition of any of the foregoing, or a mixture thereof.

8. The gel-in-matrix of claim 3 wherein said hydrogel is an alginate, carrageenan, agar, agarose, a derivatized composition of any of the foregoing, or a mixture thereof.

9. The gel-in-matrix of claim 4 wherein said hydrogel is an alginate, carrageenan, agar, agarose, a derivatized composition of any of the foregoing, or a mixture thereof.

10. The gel-in-matrix of claim 1 wherein said hydrogel is an agarose or derivatized agarose.

11. The gel-in-matrix of claim 4 wherein said hydrogel is an agarose or a derivatized agarose.

12. The gel-in-matrix of claim 1 wherein said hdyrogel comprises about 0.05–10% w/w gel-forming component based upon the total gel.

13. The gel-in-matrix of claim 11 wherein said hdyrogel comprises about 0.05–10% w/w gel-forming component based upon the total gel.

14. The gel-in-matrix of claim 1 wherein said matrix comprises a material inert with respect to the hydrogel, having pores with a mean characteristic dimension of less than about 2 mm.

15. The gel-in-matrix of claim 13 wherein the matrix comprises a material inert with respect to the hydrogel, having pores with a mean characteristic dimension of less than about 2 mm.

16. The gel-in-matrix of claim 1 wherein said matrix is hydrophilic.

17. The gel-in-matrix of claim 15 wherein said matrix is hydrophilic.

18. The gel-in-matrix of claim 1 wherein aid matrix is a porous: plastic, ceramic, metal, flexible plastic foam, rigid plastic foam, or mass of nonwoven fibers.

19. The gel-in-matrix of claim 17 wherein said matrix is a porous: plastic, ceramic, metal, flexible plastic foam, rigid plastic foam, or mass of nonwoven fibers.

20. The gel-in-matrix of claim 1 wherein said matrix is a reticulated open-cell porous plastic foam.

21. The gel-in-matrix of claim 19 wherein said matrix is a reticulated open-cell porous plastic foam.

22. The gel-in-matrix of claim 1 wherein said matrix is a polyurethane foam.

23. The gel-in-matrix of claim 21 wherein said matrix is a polyurethane foam.

24. The gel-in-matrix of claim 1 wherein said matrix contains about 20–200 pores per square inch.

25. The gel-in-matrix of claim 23 wherein said matrix contains about 20–200 pores per square inch.

26. The gel-in-matrix of claim 1 wherein said matrix is a mass of nonwoven fibers.

27. The gel-in-matrix of claim 19 wherein said matrix is a mass of nonwoven fibers.

28. The gel-in-matrix of claim 1 wherein said composition is in the form of a thin sheet, a strand, a cylindrical plug, a cylindrical annulus, a disc, or beads.

29. The gel-in-matrix of claim 19 wherein said composition is in the form of a thin sheet, a strand, a cylindrical plug, a cylindrical annulus, a disc, or beads.

30. The gel-in-matrix of claim 25 wherein said composition is in the form of a thin sheet, a strand, a cylindrical plug, a cylindrical annulus, a disc, or beads.

31. The gel-in-matrix of claim 27 wherein said composition is in the form of a thin sheet, a strand, a cylindrical plug, a cylindrical annulus, a disc, or beads.

32. The gel-in-matrix of claim 1 wherein said hydrogel further comprises at least one buffer, conventional hydrogel additive, or organic solvent in an amount or of a type which is miscible with an aqueous medium from which said hydrogel has been formed.

33. The gel-in-matrix of claim 1 wherein said hydrogen further comprises a solid or immiscible liquid immobilized within it.

34. The gel-in-matrix of claim 19 wherein said hydrogel further comprises a solid or immiscible liquid immobilized within it.

35. The gel-in-matrix of claim 21 wherein said hydrogel further comprises a solid or immiscible liquid immobilized within it.

36. The gel-in-matrix of claim 23 wherein said hdyrogel further comprises a solid or immiscible liquid immobilized within it.

37. The gel-in-matrix of claim 27 wherein said hydrogel further comprises a solid or immiscible liquid immobilized within it.

38. The gel-in-matrix of claim 1 wherein said hydrogel contains at least one biologically active component immobilized within it.

39. The gel-in-matrix of claim 4 wherein said hydrogel contains at least one biologically active component immobilized within it.

40. The gel-in-matrix of claim 9 wherein said hydrogel contains at least one biologically active component immobilized within it.

41. The gel-in-matrix of claim 13 wherein said hydrogel contains at least one biologically active component immobilized within it.

42. The gel-in-matrix of claim 19 wherein said hydrogel contains at least one biologically active component immobilized within it.

43. The gel-in-matrix of claim 25 wherein said hydrogel contains at least one biologically active component immobilized within it.

44. The gel-in-matrix of claim 30 wherein said hydrogel contains at least one biologically active component immobilized within it.

45. A method for manufacturing the gel-in-matrix of claim 1 comprising creating the fractures in said gel by partially dewatering said hydrogel in situ within said matrix.

46. The method of claim 45 wherein said hydrogen is dewatered until it contains about 10–90% of its original weight prior to said dewatering.

47. The method of claim 45 wherein said hydrogel is dewatered until it contains about 15–50% of its original weight prior to said dewatering 48. A gel-in-matrix produced by the method of claim 45.

49. The gel-in-matrix produced by the method of claim 46.

50. A gel-in-matrix produced by the method of claim 47.

* * * * *